United States Patent
Kim et al.

(10) Patent No.: US 7,413,314 B2
(45) Date of Patent: Aug. 19, 2008

(54) OPTICAL SYSTEM WITH IRIS CONTROLLED IN REAL TIME

(75) Inventors: Sung-tae Kim, Seoul (KR); Jeong-ho Nho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 11/073,574

(22) Filed: Mar. 8, 2005

(65) Prior Publication Data

US 2005/0200817 A1 Sep. 15, 2005

(30) Foreign Application Priority Data

Mar. 11, 2004 (KR) .................... 10-2004-0016629

(51) Int. Cl.
*G03B 21/14* (2006.01)
*G02F 1/13357* (2006.01)

(52) U.S. Cl. .................. 353/97; 353/85; 349/61

(58) Field of Classification Search ............ 353/28, 353/29, 97, 88, 90, 91, 93, 85, 86; 348/770, 348/771, 755; 349/60, 61
See application file for complete search history.

(56) References Cited

U.S. PATENT DOCUMENTS

| | | | |
|---|---|---|---|
| 5,379,083 A * | 1/1995 | Tomita ................ | 353/122 |
| 5,798,805 A * | 8/1998 | Ooi et al. ................ | 349/10 |
| 6,520,648 B2 * | 2/2003 | Stark et al. ................ | 353/85 |
| 6,607,280 B2 * | 8/2003 | Koyama et al. ............ | 362/601 |
| 6,769,777 B1 * | 8/2004 | Dubin et al. ................ | 353/97 |
| 6,854,851 B2 * | 2/2005 | Yamasaki et al. ............ | 353/97 |
| 6,886,944 B2 * | 5/2005 | Dahlgren ................ | 353/97 |
| 7,220,006 B2 | 5/2007 | Allen et al. | |
| 2006/0012755 A1 * | 1/2006 | Ikeda et al. ................ | 353/34 |

FOREIGN PATENT DOCUMENTS

| | | | |
|---|---|---|---|
| GB | 2 253 279 A | * | 9/1992 |
| JP | 5-188345 A | | 7/1993 |
| JP | 5-216004 A | | 8/1993 |
| JP | 6-59233 A | | 3/1994 |
| KR | 1995-22937 A | | 7/1995 |

* cited by examiner

*Primary Examiner*—Andrew T Sever
(74) *Attorney, Agent, or Firm*—Sughrue Mion, PLLC

(57) ABSTRACT

An optical system having an iris controlled in real time and a control method of amount of light thereof. The optical system includes a light source, a light modulator modulating a light emitted from the light source to a certain image, a driving part controlling the light modulator to produce the certain image and outputting luminance information of the certain image, a projector projecting the certain image, a screen on which the projected image is formed, a projection iris controlling an amount of light projected from the light modulator onto the screen, and a iris controller receiving the luminance information of the certain image from the driving part and controlling the projection iris corresponding to the luminance information of the certain image. Since the opening range of the iris is controlled in real time, the contrast ratio (C/R) is improved.

13 Claims, 6 Drawing Sheets

OPTICAL SYSTEM WITH IRIS CONTROLLED IN REAL TIME

CROSS-REFERENCE TO RELATED APPLICATIONS

This application claims the benefit of Korean Patent Application No. 2004-16629 filed on Mar. 11, 2004 in the Korean Intellectual Property Office, the disclosure of which is incorporated herein by reference in its entirety.

BACKGROUND OF THE INVENTION

1. Field of The Invention

The present invention generally relates to an optical system for enlarging and projecting a small-scale image onto a screen. More particularly, the present invention relates to an optical system for adjusting a contrast ratio by controlling an iris in real time.

2. Description of The Related Art

Complying with the demand for larger screens and higher definition of an image display device, an image projection device is rapidly prevalent which enlarges and projects a small-scale image onto a large screen using an optical system. In particular, a rear projection device, which projects an image signal from a rear side of the screen, has come into wide use in a form of a projection television.

The general rear projection device includes a light source, a liquid crystal display (LCD) panel or a digital micromirror device (DMD) panel which is a display element for generating an image by use of light emitted from the light source, a projection optical system enlarging and projecting the image produced in the panel to a certain magnification, and a screen.

The image projection device focuses the light from the light source onto the DMD panel without yielding light loss, and projects the light illuminated from the DMD panel of the projection optical system with vividness and without distortion. A critical performance measure of the image projection device is a contrast ratio (C/R) representing the light intensity difference between the brightest white and the darkest black. A higher C/R represents a better image reproduction on the screen. The C/R is acquired using the following Equation.

$$C/R = \text{white luminance/black luminance} \quad [\text{Equation 1}]$$

The conventional optical system cannot partially increase or decrease the amount of the light since its iris has a limited opening range (area). In addition, since the amount of light reflected from the surface of the digital light processing (DLP) projection device is received as it is, the C/R does not increase more than a certain value but is maintained with some constancy.

Even if the opening range of the iris is variable, the C/R increases only by adjusting the amount of light with respect to a specific image reproduction. The increase of the C/R requires the higher C/R of the projection optical system or the DMD panel, which is limited. Also, it is infeasible to continuously increase the C/R since the conventional iris cannot adjust the amount of light in association with the change in the image reproduction.

The conventional optical system has a disadvantage in that the amount of light is not effectively controlled since the position of the iris is restricted within the optical system.

SUMMARY OF THE INVENTION

To address the above problems and disadvantages of the conventional arrangement, an exemplary aspect of the present invention is to provide an optical system capable of controlling the amount of light in real time in association with changes in image reproduction.

Another exemplary aspect of the present invention is to provide an optical system capable of effectively controlling the amount of light by adjusting a position of an iris.

To accomplish the above aspect of the present invention, there is provided the optical system comprising a light source, a light modulator modulating a light emitted from the light source to a certain image, a driving part controlling the light modulator to produce the certain image and outputting a luminance information of the certain image, a projector projecting the certain image, a screen on which the projected image is formed, a projection iris controlling an amount of the light projected from the light modulator onto the screen, and an iris controller receiving the luminance information of the certain image from the driving part and controlling the projection iris corresponding to the luminance information of the certain image.

The optical system further comprises an illumination iris controlling the amount of light emitted from the light source to the light modulator. The iris controller controls at least one of the projection iris and the illumination iris corresponding to the luminance information.

According to one embodiment, the light source is a lamp and the optical system further comprises a reflector reflecting the light emitted from the lamp, and an illumination lens condensing the light from the lamp and the light reflected from the reflector and irradiating the condensed light to the light modulator. The illumination iris is disposed between the reflector and the light modulator.

The iris controller receives the luminance information in real time and controls in real time at least one of the projection iris and the illumination iris corresponding to the luminance information.

The illumination iris and the projection iris each comprise at least three sectors for determining an opening range of the iris. The iris controller receives the luminance information at a predetermined time interval and controls the sectors at the predetermined time interval corresponding to the luminance information.

The illumination iris and the projection iris each are controlled to at least two opening degrees. The iris controller controls the opening range of at least one of the illumination iris and the projection iris by driving a range of the luminance information, from a maximum to a minimum, into a number of the opening degrees.

The projection iris is disposed at a position passing a center of an optical axis formed by a main light of the certain image between the light modulator and the screen.

The projector comprises a lens array having one of a negative power and a positive power for enlarging the certain image without distortion and projecting the enlarged image onto the screen, and the projection iris is disposed between a nearest lens to the screen and the screen.

The light modulator is a digital micromirror device (DMD) panel.

The illumination iris and the projection iris each have a shape of an opening area which is one of a circular shape, an oval shape, and a square shape.

The projection iris comprises a sector determining the opening range of the projection iris, a motor moving the sector, and an iris driver means controlling the motor by receiving a voltage corresponding to the luminance information from the iris controller.

The illumination iris comprises a sector determining the opening range of the illumination iris, a motor moving the sector, and an iris driver means controlling the motor by receiving a voltage corresponding to the luminance information from the iris controller.

The projection method of a light-modulated image comprises light-modulating a light emitted from a light source and producing a certain image, detecting luminance information of the certain image, and projecting the certain image corresponding to the luminance information while controlling an amount of light of the projected image.

The method further comprises controlling an amount of light emitted from the light source corresponding to the luminance information of the certain image.

The luminance information of the certain image is detected in real time, and the amount of light is controlled in real time.

BRIEF DESCRIPTION OF THE DRAWING FIGURES

These and/or other aspects and advantages of the invention will become apparent and more readily appreciated from the following description of the embodiments, taken in conjunction with the accompanying drawing figures of which:

DETAILED DESCRIPTION OF EXEMPLARY EMBODIMENTS

Figure 1:
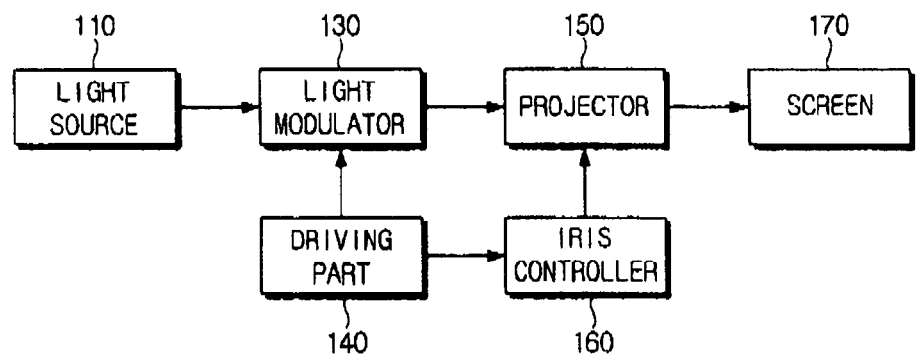
FIG. 1 is a block diagram illustrating an optical system according to an embodiment of the present invention.

Reference will now be made in detail to exemplary embodiments of the present invention, examples of which are illustrated in the accompanying drawing figures, wherein like reference numerals refer to like elements throughout. The embodiments are described below in order to explain the present invention by referring to the drawing figures.

FIG. 1 is a block diagram of an optical system according to an embodiment of the present invention.

The optical system of FIG. 1 includes a light source 110, a light modulator 130, a driving part 140, a projector 150, an iris controller 160, and a screen 170.

The light source 110 may be a lamp. A light emitted from the light source 110 is condensed to the light modulator 130 via a certain lens array. The light modulator 130 modulates the light emitted from the light source 110 to a certain image. The certain image is enlarged and displayed so that a user can see the displayed image. The driving part 140 controls the light modulator 130 to produce the image, and outputs luminance information of the image. The projector 150 projects the image onto the screen 170. The image produced in the light modulator 130 is enlarged and projected by the projector 150 without any distortion. The projector 150 includes a certain lens for the image enlargement. A position and type of the lens may be changed so as to remove lens noise. The projector 150 may include a reflector. The screen 170 displays the projected image. It will be appreciated that the display of the projected image is not limited to the screen 170.

A projection iris (not shown) is disposed within the projector 150 or between the projector 150 and the screen 170. An opening range of the projection iris is adjusted so as to control the amount of light projected onto the screen 170 from the light modulator 130. Advantageously, the opening range of the projection iris is determined using a sector which will be described in detail later. The opening range may be divided into more than two degrees. The number of the opening degrees is determined in consideration of the mechanical construction of the iris and effect of light control.

The iris controller 160 receives the luminance information from the driving part 140, and controls the opening range of the projection iris depending on the luminance information. Specifically, the iris controller 160 classifies the luminance value based on the opening degrees of the projection iris, and variably controls the opening range of the projection iris depending on the classification. According to the present embodiment of the invention, the opening range of the projection iris is constantly controlled in real time, not for a particular image or at a particular time. The opening range of the projection iris is constantly controlled only at a certain time interval or only within a predetermined range of the luminance value.

Figure 2A:
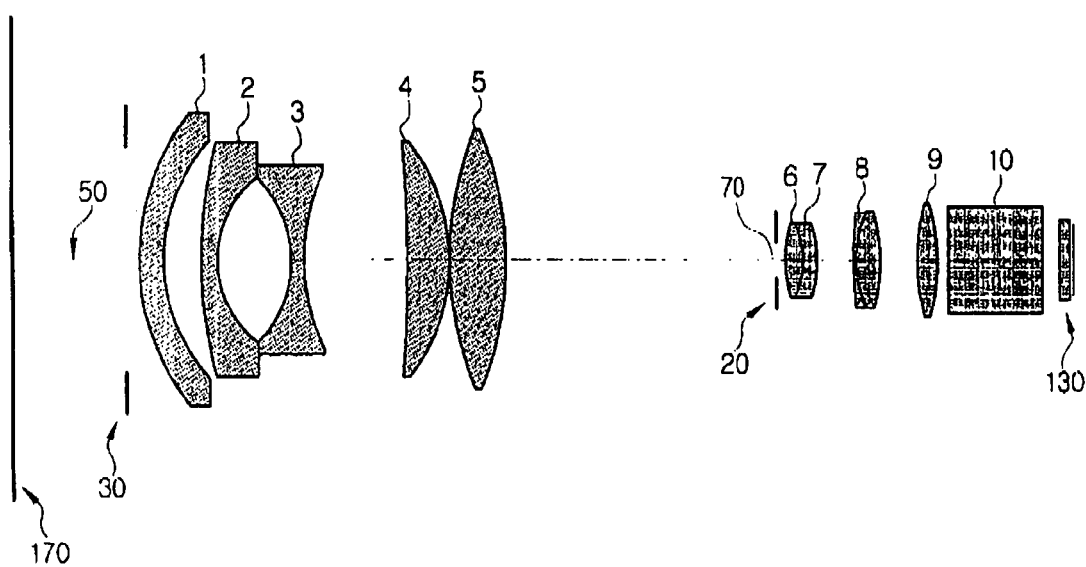
FIG. 2A is a diagram illustrating the projector of FIG. 1.

FIG. 2A illustrates the projector 150 of FIG. 1.

Referring to FIG. 2A, the light modulator 130 is a digital micromirror device (DMD) by way of example. The DMD 130 may be constructed by forming a plurality of micromirrors of an aluminum material on a silicon chip. The DMD for display of video graphics array (VGA) includes 786,432 (1,024×786=786,432) micromirrors on a DMD 1 panel. Two electrodes are disposed under each micromirror. When an electric charge is applied to one of the electrodes, the micromirror inclines to the direction of the charged electrode. On/off of the light reflection is controlled depending on the inclination angle of the micromirror, thus producing a RBG image.

The projector 150 includes a front lens group having first to fifth lenses 1 to 5 starting from the nearest lens to the screen 170, a rear lens group having sixth to ninth lenses 6 to 9, and a prism 10. The projection lens may be disposed at a position between the front lens group and the rear lens group, or, at a position between the front lens group and the screen 170. The rear lens group having a negative power initially reduces aberrations of the light which passes through the prism 10 and is reflected onto the DMD 130. The fourth and fifth lenses 4 and 5 re-compensate the aberrations using a strong positive power. While the first lens 1 compensates most of the distortion, the second and third lenses 2 and 3 secondly compensate aberrations such as coma, astigmatism, and spherical aberration. The front lens group is constructed to have the negative power, to thus increase an angle of view.

The iris adjusts the amount of light as well as passes the light. The opening range of the iris controls the amount of light of the projected image.

Figure 2B:
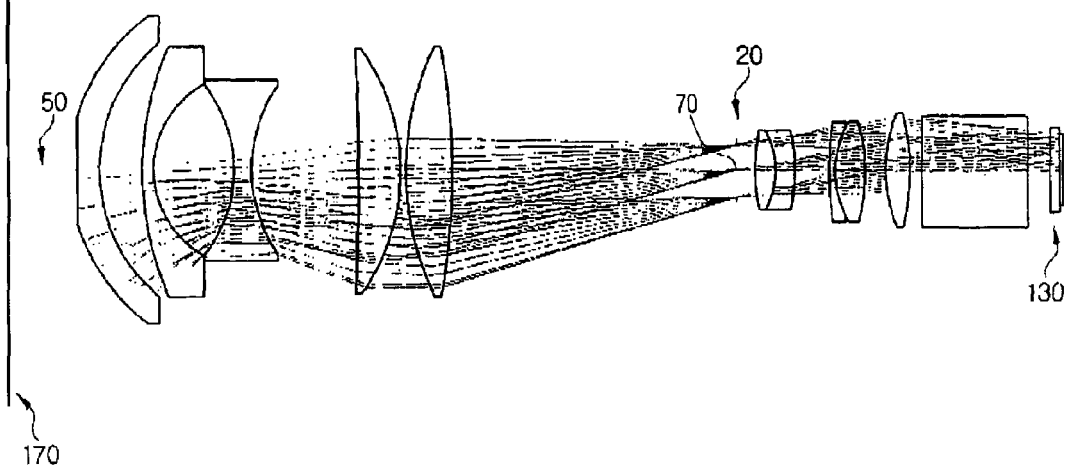
FIG. 2B is a diagram illustrating an exemplary trajectory of the light passing through the projector.
Figure 2C:
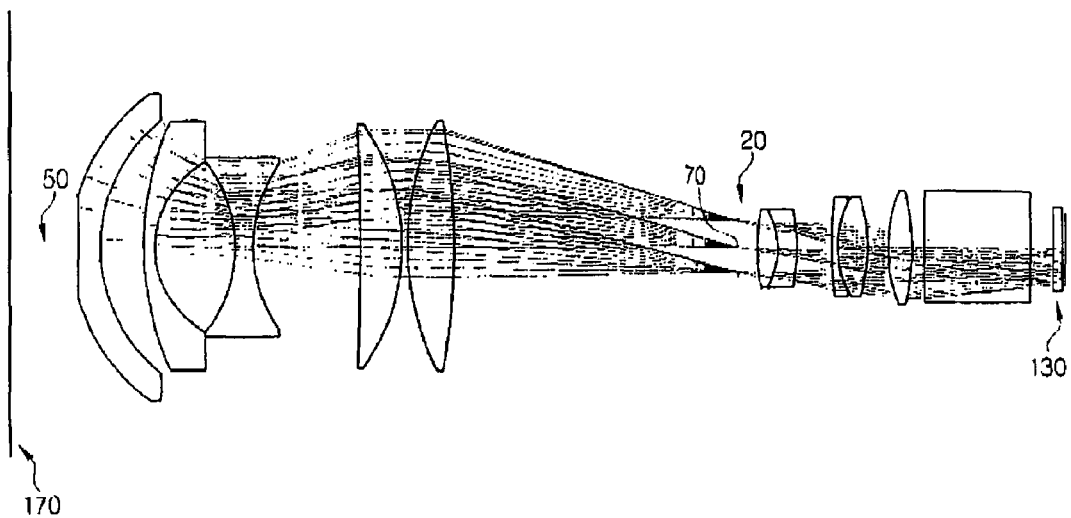
FIG. 2C is a diagram illustrating another exemplary trajectory of the light passing through the projector.

FIGS. 2B and 2C illustrate exemplary trajectories of the light passing through the projector 150.

Referring to FIGS. 2B and 2C, the lenses including the front and rear lens groups are positioned circularly symmetrically centering around an optical axis 50. The light symmetrically passes through the lenses and the iris 20, and is projected onto the screen 170. FIG. 2B illustrates the lower light passing through the projector 150, and FIG. 2C illustrates the upper light passing through the projector 150.

Figure 2D:
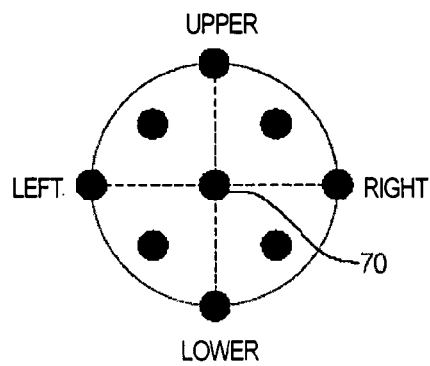
FIG. 2D is a cross-sectional view illustrating light passing through the iris of FIGS. 2B and 2C.

FIG. 2D illustrates a cross section of the light passing through the iris of FIGS. 2B and 2C.

The main light of FIG. 2B passes through a center 70 of the iris, and the upper and lower lights respectively pass through upper part and lower part of the iris circularly symmetrically. The light under the optical axis 50 is ray-traced and passes through the iris.

The main light of FIG. 2C passes through a center 70 of the iris, and the upper and lower lights respectively pass through upper part and lower part of the iris circularly symmetrically. The light over the optical axis 50 is ray-traced and passes through the iris.

Figure 3:
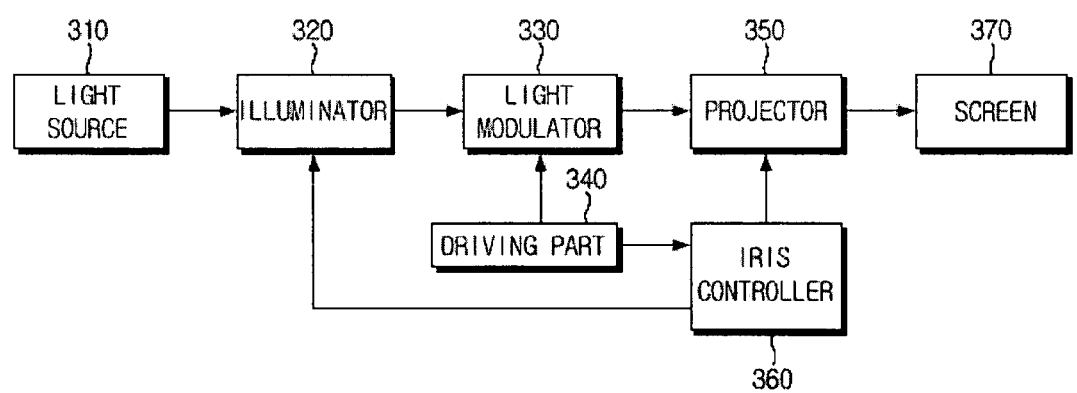
FIG. 3 is a block diagram illustrating the optical system according to another embodiment of the present invention.

FIG. 3 is a block diagram of an optical system according to another embodiment of the present invention.

The optical system according to another embodiment of the present invention includes a light source 310, an illuminator 320, a light modulator 330, a driving part 340, a projector 350, an iris controller 360, and a screen 370.

Elements having the same function as in one embodiment of the present invention are not described for the sake of brevity.

The illuminator 320 condenses the light emitted from the light source 310 to the light modulator 330.

An illumination iris (not shown) is disposed in the illuminator 320. The opening range of the illumination iris is adjustable to control the amount of the light emitted from the light source 310 to the light modulator 330.

The iris controller 360 receives the luminance information of the image from the driving part 340, and controls the opening range of at least one of the illumination iris and the projection iris (FIG. 1) depending on the luminance information. That is, the iris controller 360 controls the opening range of either the illumination iris or the projection iris, or, of both the illumination iris and the projection iris.

Figure 4:
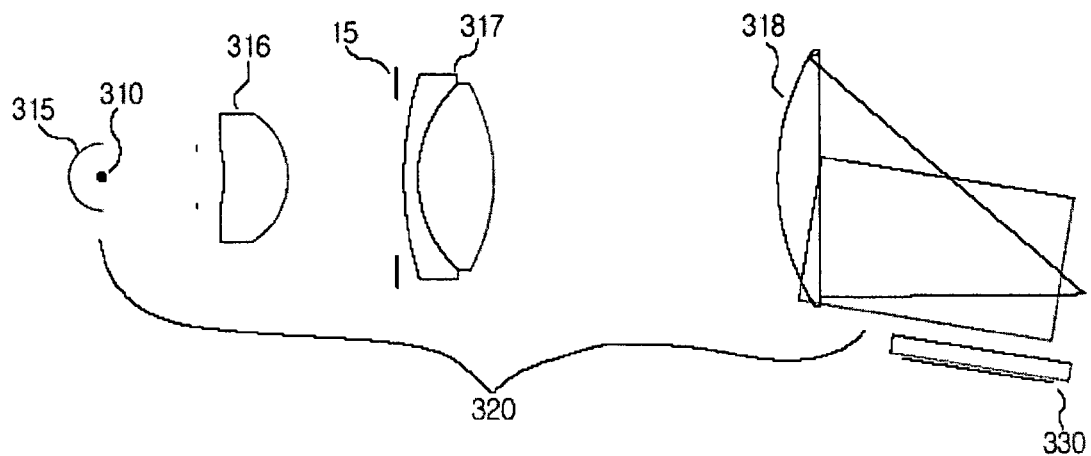
FIG. 4 is a diagram illustrating the illuminator of FIG. 3.

FIG. 4 illustrates the illuminator 320 of FIG. 3.

The illuminator 320 includes a reflector 315, illumination lenses 316 and 317, and a direction changer 318.

The reflector 315 reflects the light from the light source 310. Advantageously, the reflector 315 is formed in a shape of a parabola to enhance the reflection. The illumination lenses 316 and 317 condense the light emitted from the light source 310 and the light reflected by the reflector 315. The illumination lenses 316 and 317 are positioned so as to condense the light to the light modulator 330 without yielding any loss of light. The direction changer 318 refracts the condensed light to the light modulator 330. The direction changer 318 may be a prism.

The illumination iris 15 is disposed between the reflector 315 and the light modulator 330.

Figure 5A:
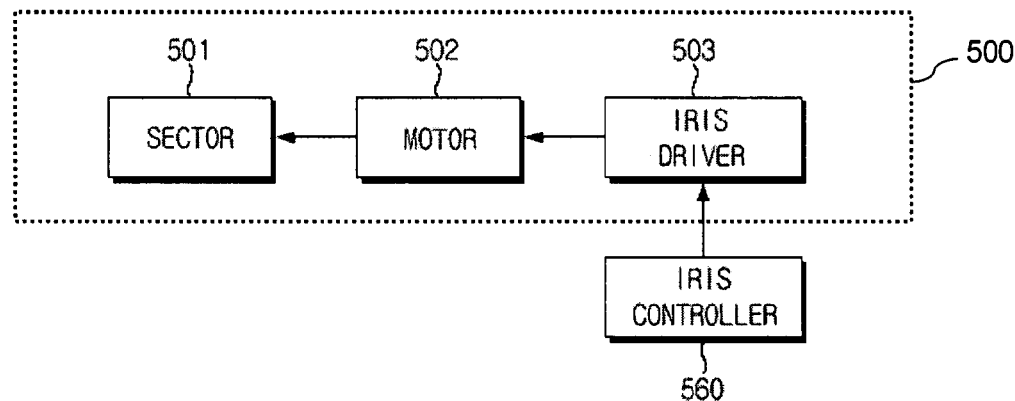
FIG. 5A is a block diagram illustrating an iris according to an embodiment of the present invention.

FIG. 5A is a block diagram of an iris according to an embodiment of the present invention.

The iris of FIG. 5A is applied to the iris of FIGS. 1 to 4.

Referring to FIG. 5A, the iris 500 includes a sector 501, a motor 502, and an iris driver 503.

The opening range (area) of the iris is determined by an operation of the sector 501. Advantageously, the number of the sector 501 is equal to or greater than 3. The motor 502 controls the movement of the sector 501 to adjust the opening range of the iris. The iris driver 503 drives the motor 502 by receiving from an iris controller 560 a signal, advantageously, a voltage varying depending on the luminance information.

Figure 5B:
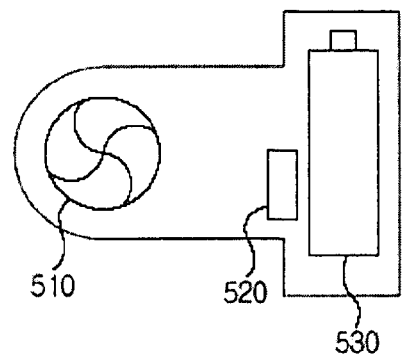
FIG. 5B is a diagram illustrating the iris of FIG. 5A.

FIG. 5B illustrates an embodiment of the iris of FIG. 5A.

Referring to FIG. 5B, the iris includes four sectors 510, a motor 530, and an iris driver 520. Advantageously, the sectors 510 engage with one or more gears (not shown) in association with the motor 530 to control the opening area of the iris.

Figure 6:
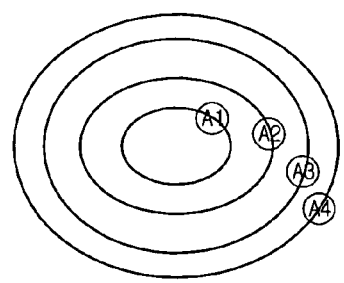
FIG. 6 is a diagram illustrating an exemplary opening range of the iris according to an embodiment of the present invention.

FIG. 6 illustrates exemplary opening ranges of the iris according to an embodiment of the present invention.

The opening range (area) of the iris varies depending on a signal from the iris controller. Referring to FIG. 6, the opening range of the iris is classified into four degrees, A1 to A4, depending on the opening area. It should be appreciated that the four degrees, A1 to A4, of FIG. 6 are exemplary and that the opening range can be classified variously in consideration of the effect of the light control of the iris and relationship of the components of the iris.

When the image is bright, that is, when the luminance value is high, the iris is controlled to the opening degree A3 or A4. When the image is dark, the iris is controlled to the opening degree A1.

The opening range of the iris is controlled in real time from the start of the image projection until the termination of the image projection, not just for a particular scene of the image, thus increasing a contrast ratio (C/R).

The optical system having the four opening degrees of FIG. 6 is described below.

The iris controller divides from a maximum to a minimum of the input luminance value into 4 degrees. The control of the opening range of the iris is described when the luminance value is divided into L2, L2, L3 and L4 according to the increment of the luminance value. Each degree may have the same or a different range. The iris controller controls the opening ranges of the iris to A1, A2, A3, and A4 by sending to the iris driver a separate signal corresponding to the classified luminance values (L1, L2, L3, and L4). When the image is bright (the highest luminance of L4), the opening area of the iris is controlled to A4 to produce a brighter image.

The degree of the luminance value is classified in correspondence with the control of the iris. For example, if the opening range of the iris is divided into five degrees, the luminance value is also classified into five degrees.

Figure 7:
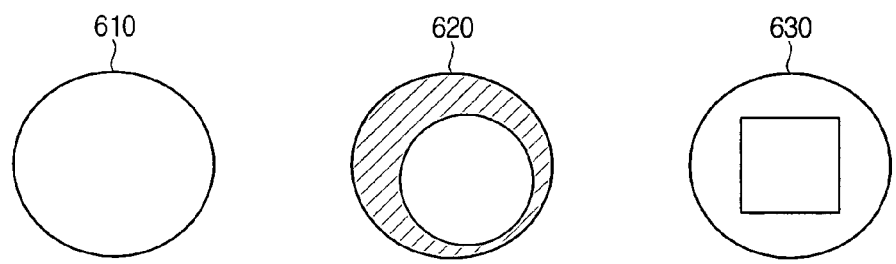
FIG. 7 is a diagram illustrating exemplary opening shapes of the iris according to embodiments of the present invention.

FIG. 7 illustrates exemplary opening shapes of the iris according to an embodiment of the present invention.

Referring to FIG. 7, the opening shape of the iris is a circular shape 610, an oval shape 620, and a square shape 630. In addition, a pentagonal shape and a hexagonal shape are applicable.

The optical system according to an embodiment of the present invention is applicable to a digital light processing (DLP) projection device using the DMD. The DLP projection device enhances primary color reproduction by removing the "mosaicking" of pixels, which is a disadvantage of the LCD projection device, and increasing the contrast effect. The DLP projection device provides a large-scale, vivid, and colorful image with a high luminance in applications including presentations such as business, education, and advertisement and entertainments such as movies.

The optical system according to an embodiment of the present invention is also applicable to an LCD projector. Lines are embedded in a liquid crystal panel of the LCD projector so as to separate a thin film transistor (TFT), which is used as a switching element, from pixels. Hence, the LCD projector has a complicated manufacturing process and relatively low resolution.

Figure 8:
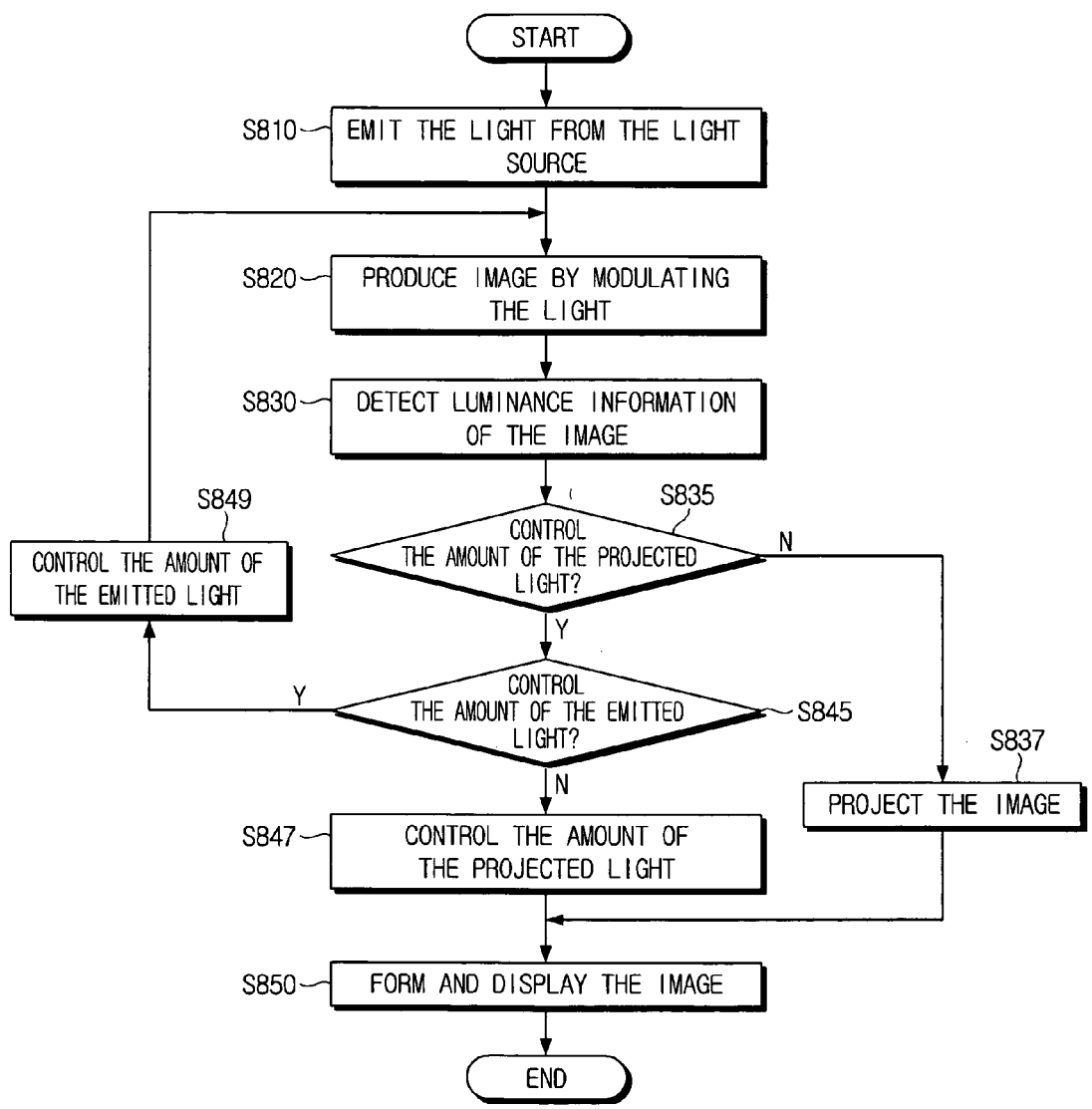
FIG. 8 is a flowchart illustrating exemplary steps of a method for controlling the amount of light of the optical system according to an embodiment of the present invention.

FIG. 8 illustrates a method for controlling the amount of light in the optical system according to an embodiment of the present invention, which is described below in detail.

The light source emits light at step S810. The light source may be a lamp. Advantageously, the reflector reflects the emitted light, and the illumination lens condenses the light. The illumination iris is disposed between the light source and the light modulator. The illumination iris controls the amount of light irradiated to the light modulator.

The light modulator modulates the light to a certain image at step S820. The certain image is produced under the control of the driving part. The driving part outputs the luminance information.

The luminance information is detected from the driving part at step S830. The detected luminance information becomes the basis of the determination of the light control in the iris controller.

The iris controller determines whether to control the amount of light based on the luminance information when projecting the image at step S835. If not, the image is projected onto the screen without the control of the amount of light at step S837. If so, the iris controller determines whether to control the amount of light emitted from the light source to the light modulator at step S845. Particularly, the iris controller determines to control the amount of light whether using the projection iris alone or using both of the projection iris and the illumination iris.

When it is determined not to control the amount of light emitted from the light source to the light modulator, the iris controller adjusts the amount of light of the image projected onto the screen by controlling the projection iris at step S847. Advantageously, the projection iris is controlled in real time or at a predetermined time interval. The amount of light is controlled in consideration of the luminance value and the opening degrees of the iris.

When it is determined to control the amount of light emitted from the light source to the light modulator, the iris controller adjusts the opening range of the illumination iris at step S849. The amount of light emitted from the light source to the light modulator is controlled by adjusting the opening range of the illumination iris. The amount of light is controlled in real time or at a predetermined time interval. The amount of light is determined in consideration of the luminance value and the opening degrees of the iris. When there is no more need to control the amount of light by referring to the luminance information of the image of which the amount of light is adjusted, the image is projected by the projector without the control of the amount of light. The image is formed and displayed onto the screen at step S850.

In light of the foregoing, even while the C/R of the optical system is uniform, the opening range of the iris is controlled in real time or at the predetermined time interval, to thus display an optimized image of which C/R is heightened depending on the image status.

Since the iris controlling the amount of light is applicable to the illuminator as well as the projector, the optical system effectively controls the amount of light.

While the embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. An optical system comprising:
    a light source;
    a light modulator modulating light emitted from the light source to a certain image;
    a driving part comparing a detected image with luminance information of the certain image and controlling the light modulator based on the comparison to produce the certain image and outputting luminance information of the certain image;
    a projector projecting the certain image;
    a screen on which the projected image is formed;
    a projection iris controlling an amount of light projected from the light modulator onto the screen;
    an iris controller connected to the driving part and receiving the luminance information of the certain image from the driving part and controlling the projection iris corresponding to the luminance information of the certain image;
    an illumination iris controlling the amount of light emitted from the light source to the light modulator, and wherein the iris controller controls at least one of the projection iris and the illumination iris corresponding to the luminance information;
    wherein the illumination iris and the projection iris each comprise at least three sectors for determining an opening range of the iris, and the iris controller receives the luminance information in real time and controls the sectors in real time corresponding to the luminance information.

2. The optical system of claim 1, wherein the light source is a lamp, the optical system further comprising:
    a reflector reflecting the light emitted from the lamp; and
    an illumination lens condensing the light from the lamp and the light reflected from the reflector and irradiating the condensed light to the light modulator, wherein the illumination iris is disposed between the reflector and the light modulator.

3. The optical system of claim 1, wherein the iris controller receives the luminance information in real time and controls in real time at least one of the projection iris and the illumination iris corresponding to the luminance information.

4. The optical system of claim 1, wherein the illumination iris and the projection iris each are controlled to at least two opening degrees, and the iris controller controls the opening range of at least one of the illumination iris and the projection iris by driving a range of the luminance information from a maximum to a minimum into a number of the opening degrees.

5. The optical system of claim 1, wherein the projection iris is disposed at a position centered on an optical axis formed by a main light of the certain image between the light modulator and the screen.

6. The optical system of claim 1, wherein the projector comprises a lens array having one of a negative power and a positive power for enlarging the certain image without distortion and projecting the enlarged image onto the screen, and the projection iris is disposed between a nearest lens to the screen and the screen.

7. The optical system of claim 1, wherein the light modulator is a digital micromirror device (DMD) panel.

8. The optical system of claim 1, wherein the illumination iris and the projection iris each have a shape of an opening area which is one of a circular shape, an oval shape, and a square shape.

9. The optical system of claim 1, wherein the projection iris comprises:
    a sector determining the opening range of the projection iris;
    a motor moving the sector; and an iris driver means controlling the motor by receiving a voltage corresponding to the luminance information from the iris controller.

10. The optical system of claim 1, wherein the illumination iris comprises:

a sector determining the opening range of the illumination iris;

a motor moving the sector; and an iris driver means controlling the motor by receiving a voltage corresponding to the luminance information from the iris controller.

11. A projection method of a light-modulated image, comprising:

light-modulating light emitted from a light source and producing a certain image controlled based on a comparison by a driving part comparing a detected image with luminance information of the certain image;

detecting from the driving part a luminance information of the certain image; and projecting the certain image corresponding to the luminance information while controlling using a projection iris to control an amount of light of the projected image;

using an illumination iris connected to the driving part to control an amount of the light modulating light emitted from the light source; and controlling at least one of the projection iris and the illumination iris corresponding to the luminance information;

wherein the illumination iris and the projection iris each comprise at least three sectors for determining an opening range of the iris, and the iris controller receives the luminance information in real time and controls the sectors in real time corresponding to the luminance information.

12. The projection method of claim 11, further comprising controlling an amount of light emitted from the light source corresponding to the luminance information of the certain image.

13. The projection method of claim 11, wherein the luminance information of the certain image is detected in real time, and the amount of light is controlled in real time.

* * * * *